United States Patent [19]
Hatswell et al.

[11] 3,892,564
[45] July 1, 1975

[54] DENTAL ALLOYS

[75] Inventors: John Sidney Hatswell; Mieczyslaw Herman Sloboda, both of London, England

[73] Assignee: Johnson, Matthey & Co., Limited, London, England

[22] Filed: Oct. 2, 1973

[21] Appl. No.: 402,778

[30] Foreign Application Priority Data
Oct. 3, 1972 United Kingdom............... 45543/72

[52] U.S. Cl. .................................................. 75/165
[51] Int. Cl.² .......................................... C22C 5/02
[58] Field of Search ........................... 75/165, 134 T

[56] References Cited
UNITED STATES PATENTS

| | | | |
|---|---|---|---|
| 3,068,127 | 12/1962 | Patalong et al. ................... | 75/165 X |
| 3,134,671 | 5/1964 | Prosen .............................. | 75/165 X |
| 3,254,279 | 5/1966 | Cohn et al. ....................... | 75/165 X |
| 3,574,610 | 4/1971 | Prosen .................................. | 75/165 |
| 3,574,611 | 4/1971 | Prosen .................................. | 75/165 |

OTHER PUBLICATIONS

Hansen, "Constitution of Binary Alloys" 2d ed., McGraw-Hill, N.Y. 1958, Au–Ga, pp. 204–206.

*Primary Examiner*—L. Dewayne Rutledge
*Assistant Examiner*—E. L. Weise
*Attorney, Agent, or Firm*—Cushman, Darby & Cushman

[57] ABSTRACT

Gallium-bearing gold alloys particularly low melting point alloys useful for example, as solders, for articles of jewellery and in dental work and containing apart from impurities, 1 – 10 wt percent gallium, 0 – 25 wt percent copper, 0 – 33 wt percent silver and 0 – 10 wt percent zinc, the balance in all cases consisting of gold.

13 Claims, No Drawings

DENTAL ALLOYS

This invention relates to gallium-bearing gold alloys and more particularly low melting point alloys of this type which are useful as solders.

Solders used in the fabrication of gold jewellery articles and in dental work must not only be satisfactory joining media, but they must also match the gold content of materials joined and should match their colour. In addition, for each group of carat golds there should be available several solders with suitably spaced melting ranges thereby enabling them to be used for making two or more soldered joints in close proximity. In such cases, it is often necessary to use the so-called step-by-step joining technique. In this technique each successive joint is made with a solder which has a melting point lower than that of the solder used in the preceding stage; in this way the risk of a previously made joint or of previously made joints being damaged by heat is reduced.

It is relatively easy to meet these requirements in the case of solders for joining low-carat golds. For example, 9 carat gold solder only contains 37.5 wt percent gold and the remaining 62.5 wt percent is made up of various alloying additions selected to produce a wide range of alloys having different soldering properties among which solders suitable for joining any one of the existing 9 carat golds can be found, even when the step-by-step joining technique has to be used.

The formulation of 18 carat gold solders (i.e., solders containing at least 75 wt percent gold) is however, more difficult because the total quantity of alloying elements that can be introduced to produce a material which, in addition to all the other desirable properties, has a sufficiently low melting point and the right colour, is only 25 wt percent. As a result, the existing range of 18 carat gold solders is rather limited and not sufficiently large to provide an answer to all the practical joining problems. Difficulties are experienced in joining certain types of 18 carat white golds because 18 carat white solders with sufficiently low melting points are unavailable.

Accordingly, one object of the present invention was to develop a range of gold-solders suitable for joining 18 carat white golds which could be used in step-by-step brazing applications. Where a range of solders is required to match the colour of 18 carat white golds, the solder should contain at least 75 wt percent gold and have melting points within the temperature range 600°–800°C. A further object was to develop such a range of gold solders which could be fabricated by conventional methods in the form of thin wire and tape.

According to the present invention an alloy consists, apart from impurities, of 1–10 wt percent gallium, 0–25 wt percent copper, 0–33 wt percent silver and 0–10 wt percent zinc, the balance in all cases consisting of gold. Conveniently, the quantity of gallium and optional additions which are present are such that the proportion of gold in the final alloy does not fall below 65 wt percent and, preferably, the gold content should not fall below 75 wt percent.

The following are examples of ranges of alloys according to the present invention. They were prepared by melting pure charges of the metals concerned and in recrystallised alumina crucibles in a carbon monoxide atmosphere. The alloys were then tilt-poured into pre-heated and sooted "Mallory 3" (Registered Trade Mark) moulds.

EXAMPLE 1

|  | wt% |
|---|---|
| Gallium | 1–10 |
| Gold | Balance |

A preferred composition within this range is Ga 5 wt percent, Au 95 wt percent possessing a pale yellow colour and a melting range of 73°–790°C (± 10°C).

EXAMPLE 2

|  | wt% |
|---|---|
| Gallium | 1–10 |
| Copper | 1–25 |
| Gold | Balance |

A preferred composition within this range is Ga 10 wt percent, Cu 15 wt percent and Au 75 wt percent. This composition has a yellowish white colour and a melting range 620°–660°C (± 10°C).

EXAMPLE 3

|  | wt% |
|---|---|
| Gallium | 1–10 |
| Silver | 1–33 |
| Gold | Balance |

A preferred composition within this range is Ga 6 wt percent, Ag 19 wt percent and Au 75 wt percent. This composition has a yellowish white colour and melting range of 590°–650°C (± 10°C).

EXAMPLE 4

|  | Wt% |
|---|---|
| Gallium | 1–10 |
| Copper | 1–25 |
| Silver | 1.33 |
| Zinc | 0.6 |
| Gold | Balance |

A preferred composition in this range is Ga 6 wt percent, Ag 16 wt percent, Cu 3 wt percent and Au 75 wt percent. This composition has a yellowish white colour and a melting range 590°–630°C (± 10°C).

EXAMPLE 5

|  | Wt% |
|---|---|
| Gallium | 1–10 |
| Zinc | 1–10 |
| Gold | Balance |

A preferred composition in this range is Ga 6 wt percent, Zn 6 wt percent and Au 88 wt percent. This composition has a white colour and a melting range of 550°–590°C (± 10°C).

EXAMPLE 6

|  | Wt% |
|---|---|
| Gallium | 1–10 |
| Zinc | 1–10 |
| Copper | 1–25 |
| Gold | Balance |

A preferred composition in this range is Zn 6 wt percent, Ga 6 wt percent, Cu 13 wt percent and Au 75 wt percent. The composition has a pale yellow colour and a melting range 650°–710°C (± 10°C).

The above materials (with the exception of Example 5) are particularly useful industrial soldering media because they can be more easily fabricated by standard methods (for example, casting, rolling and/or wire drawing) in the form in which they are normally applied, that is, in the form of thin wires and tapes.

This applied especially to the preferred gold-copper-gallium and gold-copper-silver-gallium compositions given in Examples 2 and 4. The practical usefulness of these two alloys was further demonstrated as indicated in Example 7 below by the results of brazing tests carried out according to British Standard No: 3384: 1961 Specification on samples of the following proprietary dental gold materials: Corodent, Dentomat, Dordent, Dentecon and Binormet (all Registered Trade Marks).

EXAMPLE 7

The brazing tests were carried out on 0.010 in. thick strips of each of the proprietary dental alloys named above and using gold solder in accordance with Examples 2 and 4. In each test a 0.010 in. thick strip of a dental alloy was heated to redness, pickled in dilute mineral acid, washed with water and formed into a tube approximately 25 mm. long and 10 mm. diameter with a lapped seam of about 2 mm. overlap. After fluxing the joint area with Easy-flo Flux Paste (Registered Trade Mark) a small piece (0.02–0.05 g) of the gold solder was placed at the middle of the lap on the inside of the tube. The tube was then held over a torch flame (with the lap seam downwards) until the solder was seen to run and form a joint. After cooling the soldered specimen was placed in a vice (with the joint midway between the jaws) and flattened.

No difficulties were experienced in making satisfactory soldered joints in any of the dental golds used in these tests, and none of the soldered tube specimens cracked when flattened in a vice. Moreover, after the joints were cleaned and polished, the colours of the solders and dental golds were so well matched that it was very difficult and in some cases impossible to locate the joint.

The alloys described in Example 5 may be satisfactorily used in powder form.

What we claim is:

1. An alloy containing, apart from impurities, 5 to 10 wt percent gallium, 3 to 15 wt percent copper, 0 to 6 wt percent zinc, 0 to 19 wt percent silver and 75 to 95 wt percent gold.

2. An alloy according to claim 1 containing 16 to 19 wt percent silver.

3. An alloy containing, apart from impurities, 1 to 10 wt percent gallium and at least one of the following: 1 to 25 wt percent copper, 1 to 33 wt percent silver and 1 to 10 wt percent zinc; the balance being gold.

4. An alloy according to claim 3 consisting of 1 – 10 wt percent gallium, 1 – 25 wt percent copper and balance gold.

5. An alloy according to claim 4 consisting of 10 wt percent gallium, 15 wt percent copper and 75 wt percent gold.

6. An alloy according to claim 3 consisting of 1–10 wt percent gallium, 1 to 33 wt percent silver and balance gold.

7. An alloy according to claim 6 consisting of 6 wt percent gallium, 19 wt percent silver and 75 wt percent gold.

8. An alloy according to claim 3 consisting of 1–10 wt percent gallium, 1–25 wt percent copper, 1 – 33 wt percent silver, 0 to 6 wt percent zinc and balance gold.

9. An alloy according to claim 8 consisting of 6 wt percent gallium, 16 wt percent silver, 3 wt percent copper and 75 wt percent gold.

10. An alloy according to claim 3 consisting of 1 to 10 wt percent gallium, 1 to 10 wt percent zinc and balance gold.

11. An alloy according to claim 10 consisting of 6 wt percent gallium, 6 wt percent zinc and 88 wt percent gold.

12. An alloy according to claim 3 consisting of 1 to 10 wt percent gallium, 1 to 10 wt percent zinc, 1 to 25 wt percent copper and balance gold.

13. An alloy according to claim 12 consisting of 6 wt percent zinc, 6 wt percent gallium, 13 wt percent copper and 75 wt percent gold.

* * * * *